June 20, 1939.    C. C. FARMER    2,163,396
SLACK ADJUSTER
Filed Jan. 29, 1938
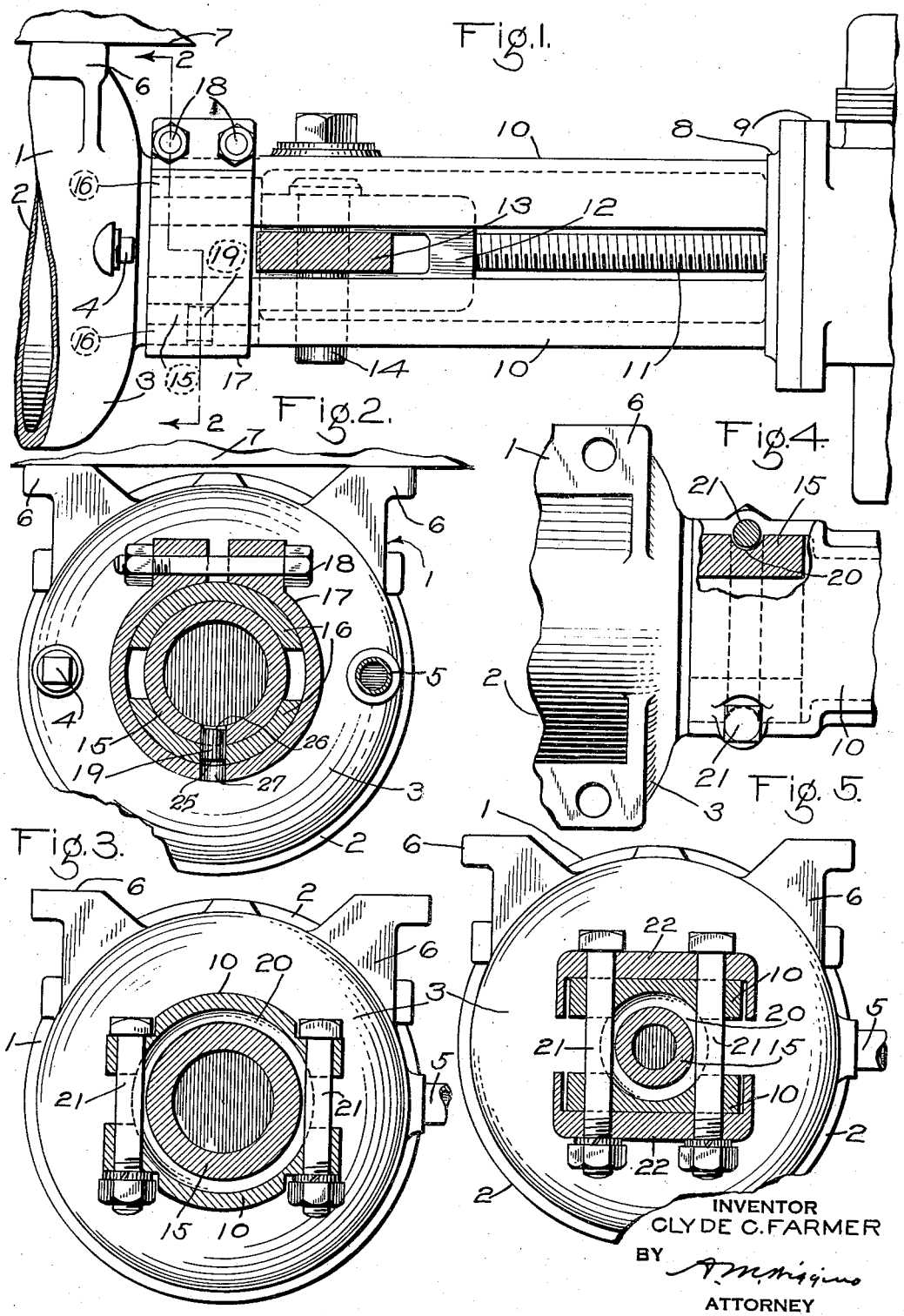
INVENTOR
CLYDE C. FARMER
BY
ATTORNEY Patented June 20, 1939

2,163,396

UNITED STATES PATENT OFFICE 2,163,396

SLACK ADJUSTER

Clyde C. Farmer, Pittsburgh, Pa., assignor to The Westinghouse Air Brake Company, Wilmerding, Pa., a corporation of Pennsylvania Application January 29, 1938, Serial No. 187,698

4 Claims. (Cl. 188—202)

This invention relates to slack adjusters of the type employed on railway vehicles and more particularly to the mountings for slack adjusters.

Slack adjusters are employed in connection with railway vehicle brake equipment for automatically taking up slack in the brake rigging resulting from wear of brake shoes and wear in the pin connections between the rods and levers of the rigging, so that the travel of the usual brake cylinder piston required to apply the brake shoes against the car wheels will remain substantially the same regardless of such wear.

In certain installations the slack adjuster is secured to the pressure head of the brake cylinder which is at times secured to the frame of a vehicle truck, and secured to the slack adjuster is one end of a dead lever of the brake leverage system, the adjuster being operative to shift the position of the end of said lever as required to compensate for wear of the parts of the system.

In order that the dead lever may be mounted on a vehicle truck and operate without interference with the various parts of the truck it is often necessary to dispose the adjuster at one angle or another relative to the brake cylinder secured to the truck.

To meet the various installation requirements of different trucks it has heretofore been the practice to provide brake cylinders having integral adjuster mounting lugs arranged at various angles to permit different angular mounting of the adjusters on the brake cylinders, each brake cylinder permitting only one particular angular mounting.

It is undesirable to have to stock brake cylinders differing only in the angularity of the slack adjuster mounting lugs on the end of the cylinders. It has therefore become the practice to delay the manufacture of brake cylinders until after the trucks have been designed and the particular angle at which the dead lever will have to be installed in the truck has been determined, after which the brake cylinders are made to suit the particular trucks.

The principal object of the present invention is to provide a universal mounting for slack adjusters on brake cylinders whereby only one design of brake cylinder will be provided for all truck installations and will permit the angular mounting of the slack adjuster thereon in whatever position is required to suit any particular installation, thereby obviating the above described undesired characteristics of the usual well known construction.

Other objects and advantages will be apparent from the following more detailed description of the invention.

In the accompanying drawing, Fig. 1 is a side elevational view of a portion of a fluid pressure operative brake cylinder device and automatic slack adjuster device secured thereto and embodying one form of the invention; Fig. 2 is a sectional view taken on the line 2—2 in Fig. 1; Fig. 3 is a view similar to Fig. 2 and embodying a modified form of the invention; Fig. 4 is a plan view with a portion broken away of the construction shown in Fig. 3; and Fig. 5 is a view similar to Fig. 2 and embodying still another form of the invention.

In the drawing the reference character 1 indicates a fluid pressure operative brake cylinder device which may be of any desired construction, but which for the purpose of illustration comprises a cylindrical body portion 2 and a pressure head 3 formed integral therewith, there being provided in the pressure head two spaced pipe connections one closed by a plug 4 and in the other there is secured one end of a pipe 5 through which fluid under pressure is adapted to be supplied to and released from said brake cylinder device for effecting an application and a release of the brakes. The pipe 5 and plug 4 may be reversed, if desired, to facilitate piping of an installation. The brake cylinder is provided on one side with the usual mounting lugs 6 through the medium of which the brake cylinder is adapted to be rigidly secured to any suitable portion of a vehicle truck, such as that indicated by the reference character 7.

The reference character 8 indicates an automatic slack adjuster device which may be of any desired type, but which for the purpose of illustration comprises a body portion 9 to which there is secured two spaced arms 10. Slidably mounted between the arms 10 and secured to one end of a slack takeup element preferably in the form of an adjusting screw 11 is a cross-head 12. One end of a dead lever 13, which forms a part of a vehicle brake rigging, is disposed between the jaws of cross-head 12 and is pivotally secured therein by a pin 14 extending through said jaws and lever.

In the slack adjuster body 9 there is provided fluid pressure controlled means (not shown) which is adapted to operate each time the piston (not shown) in the brake cylinder 1 moves further than a predetermined amount in effecting an application of the brakes, to draw the screw 11 and thereby the cross-head 12 and the end of the dead lever 13 in the direction towards body 9 a slight amount for thereby taking up a certain increment of slack in the brake rigging. The slack adjuster will be operated as just described a number of times during the life of the brake shoes on a truck and in thus operating will maintain the slack in the rigging substantially constant. This operation is so well known however as well as the construction of the slack adjuster device, that further description thereof is not deemed essential to a clear understanding of the present invention.

According to the invention there is provided on the pressure head 3 an outstanding circular boss 15 which may, if desired, be hollow as shown. The two ends 16 of the slack adjuster arms 10 are shaped to slidably fit over the boss 15 and encircling these ends of the slack adjuster arms is a clamping ring 17 preferably of substantially the same width as the length of boss 15, there being provided through the two ends of said ring two bolts 18 adapted upon tightening to rigidly clamp the two ends 16 of the slack adjuster arms 10 to the cylinder boss 15. The two arms 10 are slightly resilient which facilitates their being clamped down on the cylinder boss 15 as just described, as will be evident. A dowel pin 19 is provided in suitably aligned bores 25 and 26 in one of the two arms 10 of the slack adjuster and in the cylindrical boss 15, respectively, for securely holding the slack adjuster in a preadjusted position relative to the brake cylinder 1.

This dowel also acts to prevent the slack adjuster from being pulled off of the boss 15 in case it becomes loose on said boss due to any reason, such as stretching of the bolts 18.

In mounting the slack adjuster 8 on a brake cylinder 6 already mounted on a truck, the two adjuster arms 10, upon which the clamping ring 17 is already slidably mounted, are slipped over the cylinder boss 15.

On one truck it may be possible to install the dead lever 13 so that it will lie in a horizontal plane such as shown in Fig. 1 of the drawing for the purpose of illustration, while on another truck it may be necessary to install the dead lever 13 at an angle to the horizontal. Whatever the position of the dead lever, however, the adjuster 8 after being mounted on the boss 15 is turned on said boss relative to the brake cylinder 6 until the jaws of cross-head 12 are disposed at the proper angle for the reception of the end of the dead lever 13. The bolts 18 in the clamping ring 17 are then tightened to rigidly secure the adjuster in this position. It will be noted that before tightening bolts 18 the clamping ring 17 can be turned on the adjuster arms 10 to a position in which neither the brake cylinder pipe 5 nor pipe plug 4 will interfere in any way with the use of a wrench on said bolts.

After the adjuster is clamped in position by the ring 17 the holes 25 and 26 are drilled through one of the adjusted arms 10 and the boss 15, respectively in alignment with a bore 27 through the ring 17, and the dowel 19 is then driven into the holes 25 and 26 to the position shown for thereby rigidly connecting the adjuster arm 10 to the boss 15. The bore 27 through the ring 17 may be either drilled before the ring 17 is applied to the adjuster or at the time the holes 25 and 26 are drilled through the adjuster arm 10 and boss 15, which ever is desired. It is also desired to point out that it is not necessary to drive the dowel 19 completely through the ring 17 as is shown in the drawing.

In the modified construction shown in Figs. 3 and 4 an annular groove 20 is provided in the outer surface of the boss 15 approximately midway between the ends of said boss. The ends of the adjuster arms 10 are shaped to slidably fit over the boss 15 and connecting the two arms of the adjuster at opposite sides of the boss 15 are two parallel bolts 21 so spaced from each other as to extend through the groove 20 at either side of said boss. These bolts must be removed from the adjuster arms 10 in order to mount the adjuster on the brake cylinder boss 15 after which the bolts are applied to said arms. The slack adjusted 8 is then turned on the boss 15 to the proper position for alignment with the brake lever 13 and then the bolts are tightened up thereby rigidly securing the slack adjuster to the brake cylinder in the desired adjusted position. It will be noted that since these bolts extend through the groove 20 they will act to securely hold the adjuster to the brake cylinder 6 in case the adjuster becomes loose on boss 15 due for instance to the stretching of the bolts 21.

The modified construction shown in Fig. 5 is substantially the same as that shown in Figs. 3 and 4 except that the opposite outer faces of the adjuster arms are flat and secured between the ends of bolts 21 and said faces are U-shaped clamping elements 22, the legs of said elements extending over the adjacent sides of said arms.

In the construction shown in Figs. 3 to 5 it will be noted that the bolts 21 turn with the adjuster arms 10 and this construction is particularly adapted to brake cylinders in which pipe 5 is connected to the side of the brake cylinder as shown. When pipe 5 is connected to the end of the brake cylinder as shown in Figs. 1 and 2, said pipe and the bolts 21 would interfere in certain angular positions. Such interference is however avoided with the construction shown in Figs. 1 and 2 since the bolts 18 do not turn with the adjuster during adjustment thereof, and this construction is as well adapted to brake cylinders such as shown in Figs. 3 and 5 as to the type shown in Figs. 1 and 2, as will be evident.

While several embodiments of the invention have been described in detail it is not desired to limit its scope to these embodiments or otherwise than by the terms of the appended claims.

Having now described my invention, what I claim as new and desire to secure by Letters Patent, is:

1. In a vehicle brake equipment, in combination, a fixed element having a cylindrical boss, a slack adjuster for said brake equipment comprising a casing having two spaced resilient arms adapted to slidably engage said boss, said arms being rotatably adjustable on said boss; a clamping ring surrounding said arms and boss and adjustable relative to said arms in a direction peripherally of said boss, and means for contracting said ring on said arms for rigidly clamping said arms to said boss in a desired position of adjustment of said arms and ring.

2. In a vehicle brake equipment, in combination, a fixed element having a cylindrical boss, a slack adjuster for said brake equipment comprising a casing having two spaced resilient arms adapted to slidably engage said boss, said arms being rotatably adjustable on said boss; a clamping ring surrounding said arms and boss, and means for contracting said ring on said arms for rigidly clamping said arms to said boss in a desired position of rotation, one of said arms and said boss having aligned bores, and a pin secured in said bores for holding said arms against longitudinal movement relative to said boss.

3. In a vehicle brake equipment, in combination, a brake cylinder having a pressure head, a cylindrical boss projecting from said head, a slack adjuster device for said equipment comprising take-up means disposed to move axially of said cylinder, and further comprising two spaced arms one at either side of said take-up means, the ends of said two arms being shaped to slidably receive said boss between said arms and being adapted to be turned on said boss, a clamping ring surrounding said arms and boss, means for contracting said ring on said arms for clamping said arms to said boss, and a pin cooperating with said boss and one of said arms for securing said device against longitudinal movement on said boss.

4. In a brake equipment, in combination, a fixed element having a mounting boss, a member to which one end of a brake lever is adapted to be connected and having an opening in which said boss is disposed, said member being adapted to be mounted on said boss in different radial positions relative to said boss, a clamping ring surrounding said member and boss and adjustable relative to said member in a direction peripherally of said boss, and means for contracting said ring around said member for clamping said member in a desired position of adjustment on said boss.

CLYDE C. FARMER.